United States Patent Office 2,720,518
Patented Oct. 11, 1955

2,720,518

AZO-DYESTUFFS

Arthur Buehler, Rheinfelden, Switzerland, assignor to Ciba Limited, Basel, Switzerland No Drawing. Application July 17, 1951,
Serial No. 237,303

Claims priority, application Switzerland August 1, 1950

5 Claims. (Cl. 260—199)

According to this invention valuable azo-dyestuffs are made by coupling an ortho-hydroxy-diazo-compound of the benzene series with the coupling component of the formula

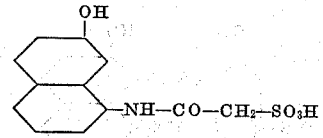

The coupling component used as starting material in the present process, namely 1-sulfo-acetylamino-7-hydroxynaphthalene, may be prepared, for example, by monoacylating 1-amino-7-hydroxynaphthalene at the amino group by means of chloracetic acid chloride, and reacting the resulting 1-chloracetylamino-7-hydroxy-naphthalene with sulfurous acid or a salt thereof.

As ortho-hydroxy-diazo compounds of the benzene series there come into consideration, for example, 5-nitro-2-amino-1-hydroxybenzene, 4:6-dichlor-2-amino-1-hydroxybenzene, 6-acetylamino-4-chloro-2-amino-1-hydroxybenzene and 6-nitro-4-methyl-2-amino-1-hydroxybenzene.

The diazo compounds may be coupled with the aforesaid coupling component in an alkaline to neutral medium. By the present process water-soluble dyestuffs are obtained even when diazo components are used which are free from groups imparting solubility in water, for example, sulfonic acid groups or carboxyl groups. Such dyestuffs are especially valuable.

The dyestuffs of the invention in the form of the free acid correspond to the general formula

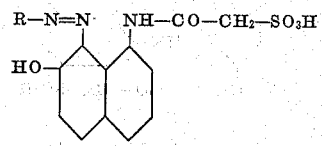

in which R represents a benzene radical which contains in ortho-position to the azo group a hydroxyl group.

These dyestuffs, which may be obtained in the form of free acids or of their salts as the result of the coupling conditions or the conditions of working up, are suitable for dyeing and printing materials of animal origin. They may be used with advantage as mordant dyestuffs, and are suitable as a rule for after-chroming processes and in some cases for the single bath chroming process, and yield valuable tints of good fastness to light. If desired, they may be converted in substance into complex metal compounds, for example, complex chromium compounds, and used for dyeing in that form.

The following examples illustrate the invention, the parts and percentages being by weight unless otherwise stated and the relationship of parts by weight to parts by volume being the same as that of the kilogram to the liter.

Example 1

15.4 parts of 5-nitro-2-amino-1-hydroxybenzene are suspended in 22 parts of hydrochloric acid of 30 per cent. strength and 150 parts of water, and diazotized at 5° C. with a solution of 6.9 parts of sodium nitrite in 25 parts of water. The suspension so obtained is mixed with a solution of 28.1 parts of 1-sulfo-acetylamino-7-hydroxynaphthalene, 4 parts of sodium hydroxide and 5.3 parts of sodium carbonate in 150 parts of water, and the coupling is brought to an end at 0–5° C. When the coupling has finished, the precipitated dyestuff corresponding to the formula

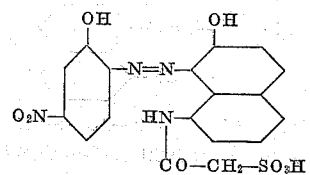

is separated by filtration, washed with dilute sodium chloride solution and dried. It is a blackish powder which dissolves in water with a violet coloration, in dilute caustic soda solution with a blue coloration and in concentrated sulfuric acid with a red coloration, and dyes wool from an acid bath red-violet tints which are converted by after-chroming into bluish-green tints having good properties of wet fastness and an excellent fastness to light.

The coupling component used in this example may be prepared as follows:

(A) 15.9 parts of 1-amino-7-hydroxynaphthalene are dissolved with the aid of 12 parts by volume of 10N-hydrochloric acid in 300 parts of water at ordinary temperature. While stirring well, a mixture of 13.6 parts of chloracetyl chloride and 30 parts of acetone and a solution of 19.7 parts of anhydrous sodium acetate in 60 parts of water are simultaneously introduced dropwise in such manner that the introduction takes approximately 2 hours and the temperature does not rise above 30° C. The monoacetyl-product separates in the form of a grey partially semi-solid mass. When the acetylation is finished the reaction product is separated by filtration and washed with water. By recrystallization from alcohol the 1-chloracetylamino-7-hydroxynaphthalene can be obtained in the form of pale grey lamellae melting at 161–162° C.

(B) 23.6 parts of 1-chloracetylamino-7-hydroxynaphthalene are dissolved in 150 parts of acetone, then mixed with a solution of 12.6 parts of sodium sulfite in 75 parts of water, and the whole is boiled under reflux for 18 hours. After distilling off the acetone, 1-sulfoacetylamino-7-hydroxynaphthalene crystallizes in the form of lustrous lamellae which may, if desired, be purified by recrystallization from hot water.

Example 2

The monoazo-dyestuffs given in the following table are prepared by coupling in the manner described in Example 1 the diazo compounds of the amines given in column I with 1-sulfo-acetylamino-7-hydroxynaphthalene. The properties of these dyestuffs are given in columns II and III. All these dyestuffs are distinguished by the fact that they yield on wool after-chromed dyeings having very good properties of fastness to fulling and light.

TABLE

| Diazo-component | Color of solution in— | | | Dyeing on wool | |
|---|---|---|---|---|---|
| | Water | dilute NaOH | concentrated $H_2SO_4$ | applied from acetic acid bath | when after-chromed |
| 4-Chloro-2-amino-1-hydroxybenzene | bluish red | red | pink | pink | grey. |
| 4:6-dinitro-2-amino-1-hydroxybenzene | violet | violet | do | dull violet | olive. |
| 6-acetylamino-4-nitro-2-amino-1-hydroxybenzene | do | red | yellowish red | blue-green | Do. |
| 6-acetylamino-4-chloro-2-amino-1-hydroxybenzene | blue-violet | do | pink | red-violet | grey. |
| 6-nitro-4-chloro-2-amino-1-hydroxybenzene | blue | green-blue | do | blue | olive. |
| 5-nitro-4-chloro-2-amino-1-hydroxybenzene | violet | blue | do | red-violet | blue-green. |
| 4:6-dichloro-2-amino-1-hydroxybenzene | do | pink | do | violet | blue-grey. |
| 4-nitro-2-amino-1-hydroxybenzene | blue-red | red | do | dull violet | yellowsh olive. |
| 6-nitro-4-methyl-2-amino-1-hydroxybenzene | blue | blue | do | violet | greenish grey. |

Formulae of illustrative dyestuffs according to the foregoing table are

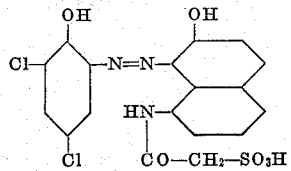

(diazo component=4:6-dichloro-2-amino-1-hydroxybenzene);

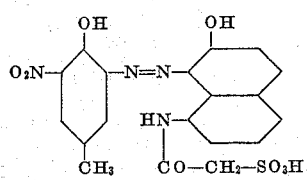

(diazo component=6-nitro-4-methyl-2-amino-1-hydroxybenzene);

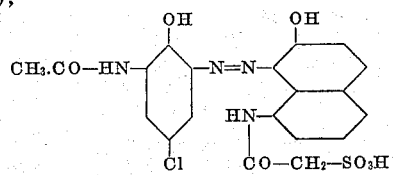

(diazo component=6-acetylamino-4-chloro-2-amino-1-hydroxybenzene).

Example 3

100 parts of well wetted wool are introduced at 60° C. into a dyebath which contains in 4000 parts of water 1 part of the dyestuff obtained as described in the first paragraph of Example 1, 4 parts of acetic acid of 40 per cent. strength and 10 parts of crystalline sodium sulfate. The temperature is raised to the boil in the course of 30 minutes and dyeing is carried on at the boil for 45 minutes. 5 parts of sulfuric acid of 10 per cent. strength are then added and dyeing is continued for a further 15 minutes. The dyebath is cooled to about 70° C., 1.1 part of potassium bichromate are added, the bath is raised to the boil and chroming is carried on at the boil for about 40 minutes. The wool is dyed a bluish green tint having good properties of wet fastness and an excellent fastness to light.

What is claimed is:

1. A monoazo-dyestuff which in its free acid form corresponds to the formula

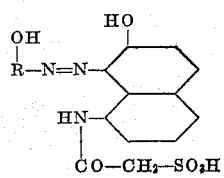

wherein R represents a benzene radical bound to the azo linkage in a position vicinal to the hydroxy group and free from groups imparting solubility in water.

2. The monoazo-dyestuff which in its free acid form corresponds to the formula

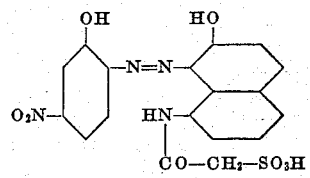

3. The monoazo-dyestuff which in its free acid form corresponds to the formula

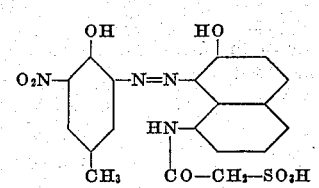

4. The monoazo-dyestuff which in its free acid form corresponds to the formula

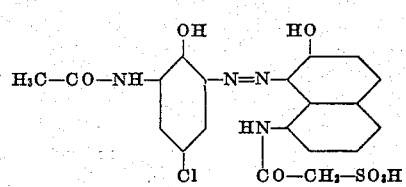

5. The monoazo-dyestuff which in its free acid form corresponds to the formula

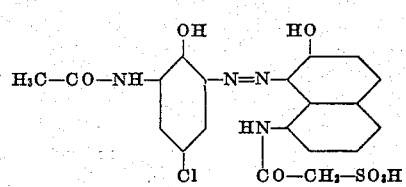

References Cited in the file of this patent
UNITED STATES PATENTS
2,602,080    Grimmel et al.    July 1, 1952